United States Patent
Schwinghammer et al.

(10) Patent No.: US 10,143,950 B2
(45) Date of Patent: Dec. 4, 2018

(54) FILTER FOR FLUIDS AND AN ADDITIVE CONTAINER FOR A FILTER

(71) Applicant: MANN+HUMMEL GMBH, Ludwigsburg (DE)

(72) Inventors: Alfons Alois Schwinghammer, Dingolfing (DE); Pamela Gohl, Remseck (DE); Carolin Marquardt, Hemmingen (DE); Stephan Niemeyer, Steinheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 363 days.

(21) Appl. No.: 14/569,757

(22) Filed: Dec. 14, 2014

(65) Prior Publication Data
US 2015/0165355 A1   Jun. 18, 2015

(30) Foreign Application Priority Data
Dec. 13, 2013  (DE) .................. 10 2013 020 590

(51) Int. Cl.
*B01D 37/02*  (2006.01)
*B01D 27/06*  (2006.01)

(52) U.S. Cl.
CPC ........... *B01D 37/025* (2013.01); *B01D 27/06* (2013.01)

(58) Field of Classification Search
None
See application file for complete search history.

(56) References Cited

U.S. PATENT DOCUMENTS

| | | | |
|---|---|---|---|
| 4,075,097 A | 2/1978 | Paul | |
| 4,075,098 A * | 2/1978 | Paul | B01D 27/08 210/167.02 |
| 4,265,748 A | 5/1981 | Villani | |
| 7,000,655 B2 * | 2/2006 | Garvin | B01D 37/025 141/100 |
| 7,591,279 B2 | 9/2009 | Martin | |
| 2005/0173325 A1 * | 8/2005 | Klein | B01D 27/06 210/206 |

* cited by examiner

*Primary Examiner* — Patrick J Orme
(74) *Attorney, Agent, or Firm* — James Hasselbeck

(57) ABSTRACT

A filter (10) for liquid has a filter housing (14) with at least one hollow filter element (12). The filter element at least partially surrounded by a liquid guidance region (54). At least one additive chamber (50) of an additive dispensing device (38) is disposed on the side of the liquid guidance region (54) opposite the corresponding exterior side of the hollow filter element (12) by means of at least one partition (42). The at least one partition has at least one dispensing port (52) by means of which the at least one additive chamber (50) can be fluidically connected to the liquid guidance region (54). The at least one dispensing port (52) is closed with at least one closure element (58) at least in the original condition of the additive dispensing device (38), this closure element being dissolvable by the liquid to be treated to release the at least one first dispensing port (52) during operation of the filter (10).

12 Claims, 2 Drawing Sheets

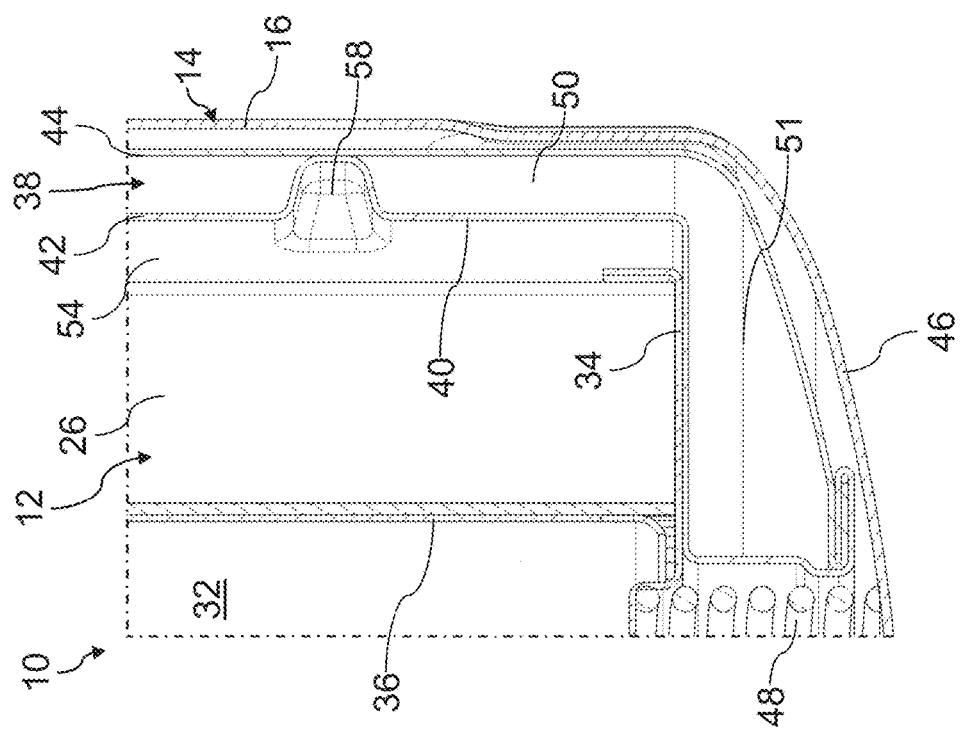
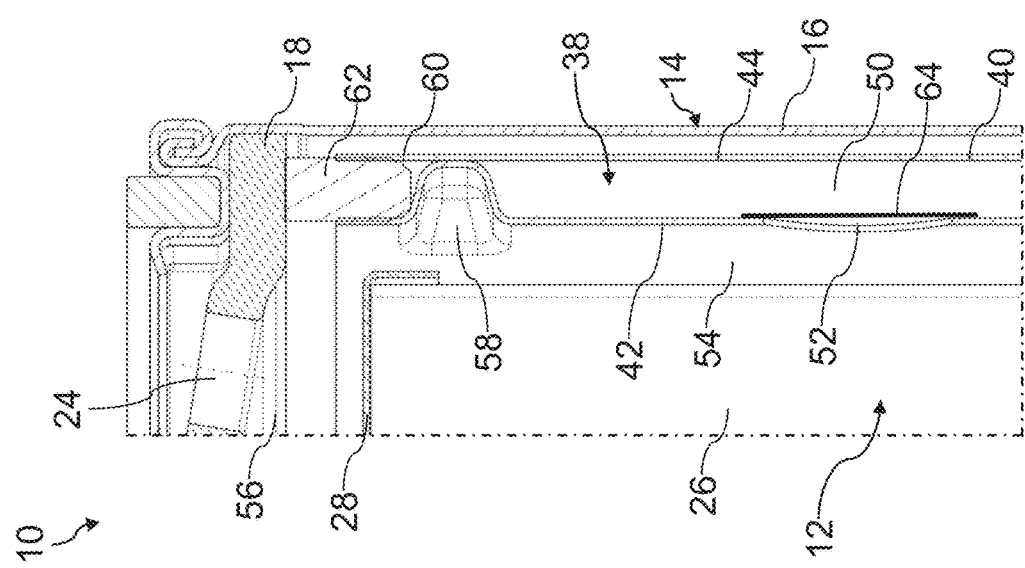

FILTER FOR FLUIDS AND AN ADDITIVE CONTAINER FOR A FILTER

TECHNICAL FIELD

The invention relates to a filter for fluids, in particular oil, preferably motor oil, transmission oil or hydraulic oil, fuel, water or a urea-water solution, in particular for an internal combustion engine, in particular in a motor vehicle, having a filter housing, which has at least one inlet and at least one outlet for the liquid to be treated and in which at least one hollow filter element, in particular a round filter element, is disposed, so that it is at least partially surrounded by a liquid guidance region of the filter for the liquid to be treated and separates the at least one inlet from the at least one outlet, wherein at least one additive chamber of an additive dispensing device for at least one additive is disposed so that it is at least partially separated by means of at least one partition from the liquid guidance region on the side of the liquid guidance region opposite a corresponding exterior side of the hollow filter element, and the at least one partition has at least one dispensing port by means of which the at least one additive chamber can be fluidically connected to the liquid guidance region.

Furthermore, the invention relates to an additive container of a filter for fluids, in particular oil, preferably motor oil, transmission oil or hydraulic oil, fuel, water or a urea-water solution, in particular for an internal combustion engine, in particular a motor vehicle, having at least one additive chamber for at least one additive; this additive container may be disposed in a filter housing having at least one inlet and at least one outlet for the liquid to be treated, so that it surrounds at least peripherally a hollow filter element and a liquid region surrounding the hollow filter element for the liquid to be treated, wherein the additive container has at least one partition by means of which the at least one additive chamber is separated from the liquid guidance region at least partially on the side of the liquid guidance region opposite the corresponding exterior side of the hollow filter element, and the at least one partition has at least one dispensing port, by means of which the at least one additive chamber can be connected fluidically to the fluid guidance region.

BACKGROUND

DE 26 13 481 A1 discloses a filter unit for oil for an engine, consisting of a filter insert, which is provided with a pleated paper filter element held between end caps that are spaced a distance apart from one another axially. The filter unit is equipped with an annular baffle extending axially within the insert between the inside of the base plate and a curved end section of a housing in the position between the radial exterior side of a filter element and an interior circumference of the insert. With the interior circumference of the side of the insert, the baffle borders a ring or an annular chamber, which can be connected to the interior of the insert through a plurality of orifices disposed at a circumferential distance and an axial distance. An additional body designed in an annular form is disposed inside the ring, this additional body being manufactured from a suitable polymer product with an additive incorporated into it. The additional body may be made of any one of a plurality of polymer products having a high molecular weight, which will dissolve slowly in oil and into which the desired oil additives can be incorporated, so that on contact of the additional polymer product composition by the oil, the polymer product has a slow dissolving rate in the oil and therefore dissolves slowly and/or is dispersed slowly in the oil. The polymer product thus serves two important purposes: it is the carrier medium for the additives and it also protects the additives from direct contact with the oil. The term "additive" includes all the materials which can be mixed with the polymer product or admixed into it and which impart properties that are beneficial in some regard to the oil circulated through the filter unit.

SUMMARY OF THE DISCLOSURE

The object of the present invention is to create a filter and an additive container of the type defined in the introduction, by means of which dispensing of an additive to the liquid can be improved, in particular being delayed.

This object is achieved with the filter according to the invention due to the fact that the at least one dispensing port is closed with at least one closure element, at least in the original condition of the additive dispensing device. This closure element can be dissolved by the liquid to be treated to clear the at least one dispensing port during operation of the filter.

According to the invention, the at least one dispensing port is closed with at least one closure element in the original condition. The term "original condition" is understood according to the invention to refer to the condition of the filter, in particular the additive dispensing device, before it is first put into operation after production or restoration, in particular topping it off with the additive. Thus, in the original condition, the at least one additive chamber is separated tightly from the liquid guidance region. Therefore the liquid cannot come in contact with the additive. Only after the at least one closure element has been released can the additive reach toward or into the liquid.

Operation of the filter may also include states in which the liquid to be treated is at a standstill in the filter. This may be the case in particular when operation of the internal combustion engine is stopped.

The at least one dispensing port may advantageously be dissolved under various conditions of the liquid acting on the corresponding closure element. The respective additive may be added to the liquid to be treated as needed from the at least one additive chamber in this way. The at least one additive to be used may thus be added with respect to the dispensing point in time and/or the dispensing quantity in particular, more precisely the liquid to be treated. On the whole, this makes it possible to improve the conditioning of the liquid.

The conditions under which the at least one dispensing port can be dissolved may be characterized in particular by the start and/or duration of the influence of the liquid to be treated on the at least one closure element and/or the condition of the liquid to be treated. Accordingly, the properties of the at least one closure element may be predefined as needed. It is possible in this way to achieve, immediately at the initial start of operation of the filter, the result whereby the additive is not added immediately to the liquid. There may be a time lag in particular after a replacement of and/or maintenance on at least one part of the filter, in particular the additive dispensing device. The time lag may advantageously be a function of the operating time of the filter and/or of the liquid and/or the service life of the internal combustion engine or it may be predetermined in that way in particular.

The filter may advantageously be provided for treatment of motor oil of an internal combustion engine of a motor vehicle. However, the invention is not limited to internal combustion engines of motor vehicles. Instead, it may also be used outside of automotive engineering, in particular in industrial motors. The invention may also be used outside of internal combustion engines, in particular in motor vehicles. The filter may also be suitable for treatment of other types of liquids, in particular oils, preferably transmission oil or hydraulic oil, fuel, water or a urea-water solution.

The filter may advantageously be used in a liquid circulation, in particular a motor oil circulation in an internal combustion engine. The liquid may be conditioned in the liquid circulation by means of the additive in this way. The properties of the liquid may thus be kept as constant as possible over the service life of the filter and/or of the liquid and/or of components provided in the liquid circulation, in particular in the internal combustion engine, if applicable. An additive that can manifest its effect in particular at a preselectable operating time or mileage of the filter and/or the liquid may be added to the at least one additive chamber.

The filter may advantageously be a so-called replaceable filter, in which the filter housing together with the filter element and the additive dispensing device may be replaced for maintenance purposes in particular. Alternatively, the filter may have a filter housing that can be opened and in which at least one replaceable filter element and/or at least one additive dispensing device that is at least partially replaceable and/or can be topped off again may be disposed.

In the manufacture or restoration, in particular the refilling, of the additive dispensing device, the at least one dispensing port may be closed by the corresponding closure element. Then the at least one additive chamber may be filled with the corresponding additive. The pre-installed ready-to-operate additive dispensing device may be disposed in the filter housing.

A single additive or a mixture of additives may be disposed in the at least one additive chamber. When the term "additive" is used in the present description for the sake of simplicity, this also includes a plurality or mixture of additives.

Additives are known active ingredients, which are added to the liquid to be treated to improve certain properties. The active ingredients may alter the physical properties and/or the chemical properties. They may also induce a change in the surface of the friction partners when added to lubricants.

The at least one additive which may be disposed in the at least one additive chamber may be liquid or solid. The at least one additive may advantageously be degraded during use, in particular being degraded chemically. The properties of the liquid can be maintained over the operating time by means of the at least one additive and/or the properties may be altered, in particular being improved, for the corresponding intended purpose.

So-called friction modifiers or TBN boosters may be added as additives to motor oil for an internal combustion engine. Friction modifiers can reduce friction losses on moving engine parts and thereby reduce fuel consumption. TBN boosters can react with acids, which may be formed by combustion in an internal combustion engine. They may be consumed in this process. TBN boosters can retard the acidification of oil. Other additives may also be used, in particular with antioxidants.

The at least one dispensing port may advantageously be in contact with the liquid guidance region on the crude fluid side of the at least one filter element. The corresponding additive may be added in a metered fashion in this way before the liquid passes through the filter element. The at least one additive to be dosed may thus have positive effects in particular on properties and/or function, in particular the lifetime of the filter element. The pH of the liquid to be treated may be influenced by means of the at least one additive in particular, so that a lower burden is placed on the filter material.

The hollow filter element may advantageously have filter bellows. The filter bellows may at least partially surround an interior space of the element. The liquid may flow through the hollow filter element from the inside to the outside or from the outside to the inside. The filter bellows may have a pleated or unpleated filter medium.

The hollow filter element may advantageously be a so-called round filter element, an oval-round filter element, a conical-round filter element or a conical-oval round filter element. The hollow filter element may also have a different type of cross section, in particular an angular cross section. It may also have some other shape instead of a cylindrical or conical shape.

Advantageously at least one part of the additive dispensing device, in particular the at least one additive chamber, optionally at least one additive container and/or at least one dispensing port may optionally be arranged outside of the hollow filter element.

The at least one additive chamber may advantageously be disposed coaxially with the at least one filter element. The at least one additive chamber may surround the at least one filter element at a uniform distance in this way. Thus the liquid flow in the liquid guidance region may be improved, in particular being made more uniform.

In one advantageous embodiment, the at least one partition may surround the at least one hollow filter element and the liquid guidance region cohesively on the periphery.

The at least one partition and thus the at least one dispensing port may be exposed to oncoming flow of the liquid over a large area in this way. A surface of the at least one partition, along the extent of which metered addition of additive may take place, can be enlarged in this way.

Due to the configuration of the at least one partition at a distance around the at least one hollow filter element, it is possible to reduce or preferably even prevent the at least one partition from covering the active filter area for filtering.

The at least one partition may advantageously extend over the total axial height of the hollow filter element with respect to its element axis. The at least one additive chamber may thus be disposed in the filter housing in a space-saving and volume-favorable manner. Alternatively, the at least one partition may also extend over only a portion of the axial height of the hollow filter element.

In another advantageous embodiment, the at least one additive chamber may be disposed in at least one additive container, which may be formed at least in part by the at least one partition. An additive container may be implemented separately in a simple manner. A separate additive container can be closed easily.

The at least one additive container may advantageously have a cross section that corresponds to the cross section of the hollow filter element. The at least one additive container may be disposed in the filter housing in a space-saving manner in this way. Furthermore, the radial extent of the liquid guidance region with respect to the element axis may be uniform over the circumference. The at least one additive container may advantageously have a round, oval or angular cross section.

The at least one additive container may advantageously be approximately cylindrical.

The at least one additive container may also be formed at least in part by a double wall. The at least one partition may then form one wall of the double wall.

Advantageously at least two walls of the at least one additive container may be connected to one another in one or more pieces. At least two walls of the at least one additive container may advantageously be joined to one another by means of a physically bonded and/or form-fitting and/or force-locking connection, in particular a flanged connection, an adhesive bond, a welded connection, a plug-in connection, a clamped connection and/or a snap connection. At least two walls of the at least one additive container may advantageously be joined tightly to one another on at least one side of the additive container. Therefore, the additive contained therein cannot escape out of the at least one additive chamber through the connecting area. Conversely, the liquid to be treated in this way cannot pass through the connecting region into the at least one additive chamber in an uncontrolled manner.

In another advantageous embodiment, at least one supporting element, in particular at least one deep-drawn nub may be provided for supporting the at least one partition against at least one other wall, optionally against an exterior wall of the at least one additive container.

With the at least one supporting element, the at least one partition may be held at a distance from the at least one other wall.

With the at least one supporting element, the at least one partition and/or the at least one other wall may be supported in a stable manner against pressure, in particular a pressure of the liquid in the liquid guidance region. The at least one additive container may optionally be supported better by means of the at least one supporting element, in particular against excess pressure.

The at least one supporting element may advantageously be implemented in/on the at least one partition. Alternatively or additionally, at least one supporting element may be implemented in/on the at least one other wall. The at least one supporting element may be prefabricated easily together with the corresponding wall in this way.

The at least one supporting element may advantageously be connected in one piece to the corresponding wall in a stable and/or simple manner.

At least one deep-drawn nub may be implemented easily in the at least one partition and/or the at least one other wall, in particular in the case of metal walls.

The at least one supporting element may advantageously extend over at least a portion of the circumference of the corresponding wall. The support may be more uniform in this way.

A plurality of supporting elements may be disposed peripherally, in particular being distributed uniformly on at least one of the walls.

In another advantageous embodiment, the at least one additive chamber, optionally the at least one additive container, may be separate from the filter housing, at least originally. The at least one additive chamber may easily be filled with a corresponding additive or an additive mixture during preassembly in this way. The at least one preassembled and prefilled additive chamber, in particular the at least one additive container, may easily be installed as a closed unit in the filter housing, in particular of the replaceable filter.

When using an openable filter housing in particular, the additive dispensing device, in particular the at least one additive chamber, optionally the at least one additive container, may advantageously be constructed at least partially from the filter housing. The additive dispensing device may be replaced at least partially in this way. Thus the at least one additive chamber, optionally the at least one additive container, may be replaced in particular when the additive has been used up. At least that part of the additive dispensing device may be replaced at maintenance intervals, which can be predetermined in particular.

The at least one additive chamber may advantageously be refilled with additive as needed. Thus, at least one part of the additive dispensing device may be reused.

The additive dispensing device, in particular the at least one additive chamber, optionally the at least one additive container, may advantageously be replaced at least partially with a similar additive dispensing device of another type. This may be advantageous in particular when the filter is to be operated under other conditions and/or with another liquid. In this case, other additives and/or a different type and/or amount of addition of the additives and/or a different closure element may be necessary.

In another advantageous embodiment, the at least one partition, optionally the at least one additive container may comprise at least metal and/or plastic.

The at least one partition, in particular the at least one additive container may be made of metal and/or plastic.

Metal can be shaped easily, in particular by bending and cutting. Metal can also be welded easily. Furthermore, the at least one supporting element may optionally be implemented easily by means of deep drawing of the metal in particular.

Plastic may be designed to be elastic. Elements made of plastic can be implemented easily in a relatively low weight. Plastic can be shaped easily, in particular by injection molding or casting. Plastic can also be joined easily to plastic or other materials, in particular by adhesive bonding or welding.

In another advantageous embodiment, the at least one additive chamber may have or be connected to at least one chamber section, in particular a bottom section, which is situated outside of a region adjacent to the liquid guidance region.

An additional reservoir for additive may be formed with the at least one chamber section in this way. The amount of available additive can thus be increased easily in this way. The at least one chamber section may be disposed in a space-saving manner at a distance from the liquid guidance region. Otherwise unused spaces in the filter housing may also be used to accommodate additives in this way.

The at least one chamber section may advantageously be situated in a region of the housing bottom of the filter housing. In the case of a curved housing bottom in particular, a region of the filter housing, which would otherwise not be usable due to the at least one filter element in particular, may be utilized.

In another advantageous embodiment, at least one of the closure elements may be released, depending on a physical and/or chemical condition of the liquid to be treated and/or the exposure time of the at least one closure element to the liquid.

At least one of the closure elements may advantageously be designed so that its condition may be changed with the liquid to be treated, in particular its shape may be dissolved. At least one of the closure elements may have or consist of a substance which can dissolve slowly under the influence of the liquid to be treated. The change in state of at least one of the closure elements may be accomplished by physical and/or chemical means. Advantageously at least one of the closure elements may have at least one material, which is soluble in or with the liquid to be treated. At least one of the closure elements may advantageously undergo chemical aging and thereby be opened up.

The condition of the liquid to be treated can be defined by its physical and/or chemical properties, in particular its degree of contamination with particles and/or water, its pH, its temperature and/or its flowability and the like.

The dissolution of at least one of the closure elements may advantageously depend on the aging of the liquid, in particular the liquid in a liquid circulation. Depending on its properties, the liquid to be treated may dissolve at least one of the closure elements and allow addition of the additive. The liquid can thus be conditioned better and in a targeted manner, as needed. Thus, by adding the additive, certain properties of the liquid can be changed, in particular being improved. Certain properties of the liquid can therefore also be preserved. The latter may be especially advantageous when using the filter in a liquid circulation in particular.

At least one of the closure elements may advantageously open in particular by chemical reaction, in particular an increase in the acid content in the motor oil (TAN), opening with a time lag in particular due to aging.

At least one of the closure elements may advantageously be water-soluble. An additive capable of binding water may be released in this way in particular when using the additive dispensing device for treatment of oil or fuel when there is water in the oil or the fuel.

At least one of the closure elements may advantageously comprise a thermally soluble material, in particular a thermoplastic material. The temperature at which the at least one closure element dissolves may advantageously be in the range of the usual operating temperature of the liquid to be treated.

Additionally or alternatively, at least one of the closure elements may be dissolved as a function of the duration of exposure of the closure element to the liquid. The at least one closure element may be dissolved as a function of a service life or the mileage of the internal combustion engine in particular in this way, and thus the additive may be added to the motor oil. The additive may thus be added to the motor oil with a time lag relative to an initial start of operation of the filter after production or restoration thereof. Thus, in particular the properties of the motor oil may also be retained or even improved over a longer service life of the internal combustion engine.

In another advantageous embodiment, the at least one closure element may at least comprise a film, in particular an adhesive film or a membrane.

The at least one closure element may be a film or a membrane.

A film or a membrane may advantageously have a small thickness in comparison with its other extent. It may thus be disposed in a space-saving manner.

The film or membrane may advantageously be applied from the side facing the at least one additive chamber to the at least one partition to cover the at least one dispensing port. The sealing of the at least one dispensing port before the first start of operation of the filter, in particular the additive dispensing device after production or restoration of same, may thus be improved. Alternatively or additionally, a film or membrane may be applied from the side facing the liquid guidance region to the at least one partition. The sealing of the at least one dispensing port after the first operation after the m manufacture or restoration of the filter can thus be improved in this way.

The film or membrane may advantageously be soluble with the liquid.

An adhesive film may easily be attached to the partition.

Multiple dispensing ports may advantageously be closed with a single film or membrane. The closure of a plurality of dispensing ports may be simplified in this way. Alternatively or additionally, at least one dispensing port may be closed with a separate film or membrane. This makes it possible to save on film material or membrane material.

In another advantageous embodiment, the at least one additive chamber may be connected to at least one filling port, which can be closed for adding the at least one additive in particular, and optionally the at least one additive container may have the at least one filling port.

The at least one additive chamber can be filled with additive easily through the at least one filling port. After filling, the at least one filling port may be closed.

In another advantageous embodiment, the at least one filling port may be formed at least by an annular clearance, in particular on a front end of the at least one additive chamber, optionally the at least one additive container.

Advantageously the at least one additive chamber, optionally the additive container, surrounding the at least one hollow filter element on the outside radially with respect to the element axis, may be filled with the additive through the annular gap on the front end in particular.

An annular gap on the front end may also be implemented easily by a double-walled, in particular cylindrical, additive container. To this end, a front end of the additive container may be simply left open.

In another advantageous embodiment, the at least one filling port may be sealable in such a manner that it can be reopened with at least one filling closure element, in particular an annular stopper.

The at least one filling port can be closed tightly with the at least one filling closure element.

The annular gap can be closed easily with an annular stopper.

The at least one filling closure element may advantageously be removed from the at least one filling port. The at least one filling port may be opened for refilling the additive chamber in this way.

Furthermore, the object according to the invention is achieved by the additive container in that the at least one dispensing port can be closed, at least in the original condition of the additive dispensing device, with at least one closure element which can be dissolved by the liquid to be treated in order to release the at least one dispensing port during operation of the filter.

The advantages and features presented above in conjunction with the filter according to the invention and its advantageous embodiments apply to the additive container according to the invention and its advantageous embodiments and vice versa accordingly.

BRIEF DESCRIPTION OF THE DRAWINGS

Additional advantages, features and details of the invention are derived from the following description, which explains one exemplary embodiment of the invention in greater detail on the basis of the drawings. Those skilled in the art will also expediently consider the features disclosed in combination in the drawings, the description and the claims individually and combine them to achieve other advantageous combinations.

The drawings show schematically:

FIG. 2 a detail of the oil filter from FIG. 1 in the region of a filter cover of a filter housing;

FIG. 3 a detail of the oil filter from FIG. 1 in the region of a housing bottom of the filter housing.

The same components are labeled with the same reference numerals in the figures.

DETAILED DESCRIPTION

Figure 1:
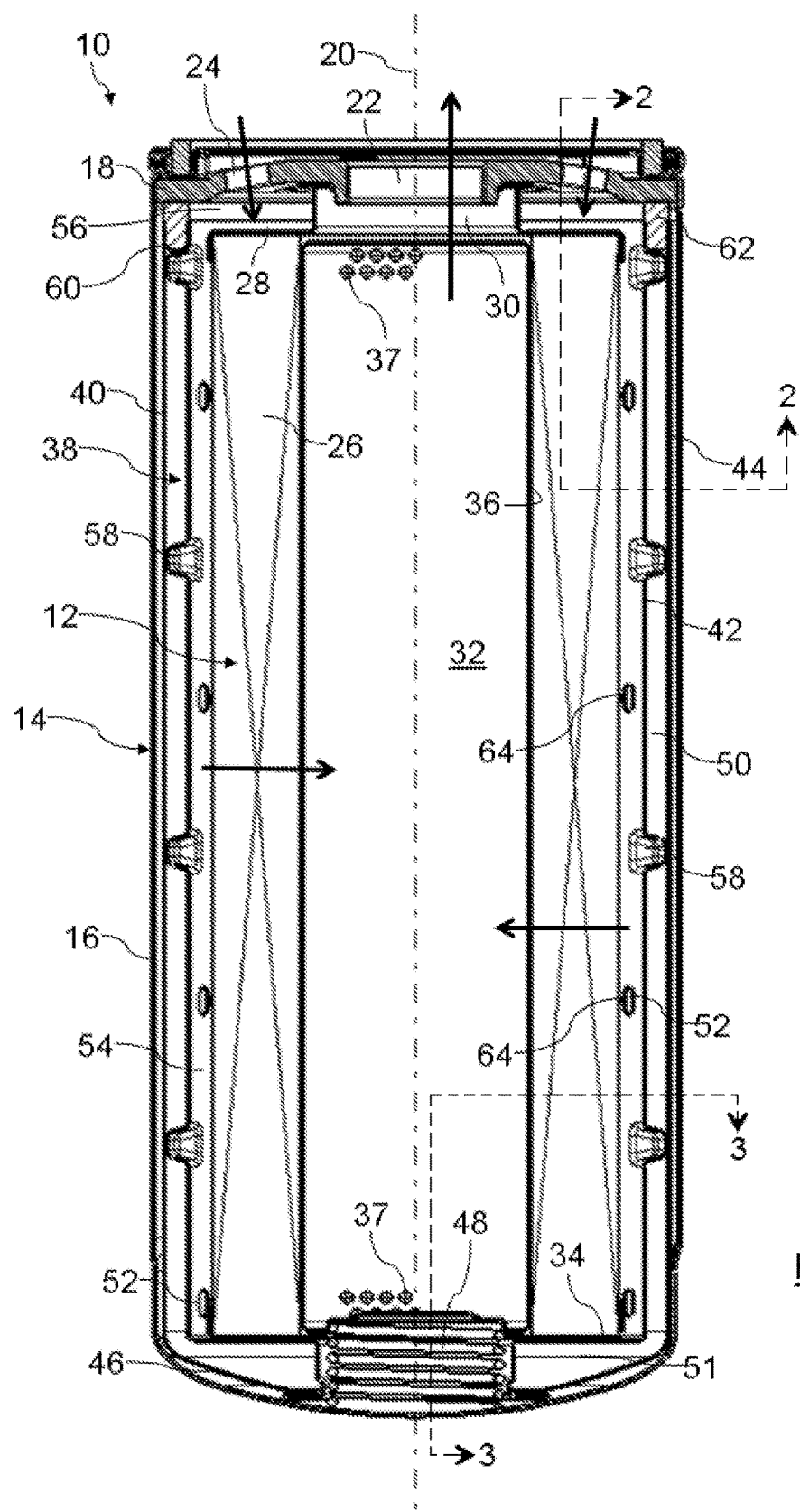
FIG. 1 a longitudinal section of an oil filter for a motor oil for an internal combustion engine, having a round filter element and an additive dispensing device.

FIG. 1 shows an oil filter 10 for a motor oil, shown in a longitudinal section. FIGS. 2 and 3 show detailed views of the oil filter 10. The oil filter 10 can be replaced and is provided in a motor oil circulation of an internal combustion engine of a motor vehicle. The oil filter 10 is a so-called replaceable filter. A filter housing 14 of the oil filter 10 may be replaced completely, with a filter element 12 and an additive dispensing device 38.

The filter housing 14 has a filter pot 16 with an installation orifice for the filter element 12, which is tightly closed with a filter cover 18. The filter cover 18 has an oil outlet 22 that is coaxial with the filter axis 20 and has a plurality of oil inlets 24 disposed eccentrically with respect to the filter axis 20.

When terms such as "radial(ly)," "axial(ly)," "coaxial(ly)," "peripheral(ly)" or the like are mentioned below, they all refer to the filter axis 20, unless otherwise mentioned specifically.

The oil filter 10 is screwed onto a filter head (not shown in FIG. 1) in the internal combustion engine by means of a screw connection. When the oil filter 10 is screwed on the filter head, the oil outlet 22 is fluidically connected to a corresponding oil drain channel of the filter head. The oil inlets 24 are then connected to a corresponding oil inlet channel of the filter head.

The filter element 12 is disposed in the filter pot 16, so that it separates the oil outlet 22 from the oil inlets 24. The filter element 12 is coaxial with the filter axis 20. In the exemplary embodiment shown here, one element axis of the filter element 12 coincides with the filter axis 20.

The filter element 12 is a so-called round filter element comprising filter bellows 26 made of a filter medium which is pleated and closed on the circumference. On its front end facing away from the filter cover 18, the filter pot 16 are tightly connected to a connecting end disk 28. The connecting end disk 28 has a coaxial through-hole 30, which connects an element interior chamber 32 to the oil outlet 22 by means of a corresponding connecting cylinder. A bottom end disk 34 is situated on the axially opposite front end of the filter bellows 26 and is tightly connected to it. The bottom end disk 34 may be closed continuously.

A supporting pipe 36 is disposed coaxially in the element interior chamber 32 and extends between the connecting end disk 28 and the bottom end disk 34. The supporting pipe 36 is open at both ends. Its peripheral wall has a plurality of through-holes for motor oil, only a few of which are shown in FIG. 1. The circumferential side of filter bellows 26 on the inside radially may be supported on the radially outer peripheral side of the supporting tube 36.

Furthermore, the additive dispensing device 38 is disposed in the filter housing 14. The additive dispensing device 38 comprises a double-walled additive container 40. The additive container 40 has a circular cylindrical shape on the whole. It is disposed as a separate component coaxially to the filter element 12 in the filter pot 16. It surrounds the filter element 12 on the outside radially and cohesively at the periphery.

The additive container 40 has an internal partition 42 on the peripheral side facing the filter element 12 and has an exterior wall 44 on the peripheral side facing away from the filter element. The partition 42 and the exterior wall 44 are made of metal.

The exterior wall 44 runs along a peripheral side on the inside radially and a housing bottom 46 of the filter pot 16. In the normal installation position of the oil filter 10, the housing bottom 46 is situated at the bottom spatially as shown in FIG. 1. However, the oil filter 10 may also be disposed in another orientation. The housing bottom 46 has an outward bulge.

In the region of the housing bottom 46, the exterior wall 44 has a coaxial orifice for a coaxial helical compression spring 48. The filter element 12 is pressed axially against the filter cover 18 with the helical compression spring 48. The radially inner edge of the exterior wall 44 surrounding the orifice is tightly flanged with a corresponding edge of the interior partition 42.

The partition 42 has a circumferential section running approximately parallel to the radially exterior circumferential side of the filter bellows 26 at a radial distance therefrom. The circumferential section of the partition 42 extends over the entire axial height of the filter bellows 26 and protrudes above the partition on the side facing the filter cover 18.

On the side facing the housing bottom 46, the peripheral section of the partition 42 develops into a bottom section on the inside radially after a 90° bend. The bottom section of the partition 42 extends radially along the outside of the bottom end disk 34 in the direction of the helical compression spring 48, where the bottom section develops into a lower coaxial peripheral section after another 90° bend in the direction of the housing bottom 46. The partition 42 is flange-connected to the outside wall 44 on the free edge of the lower peripheral section.

The additive container 40 includes an additive chamber 50 for an additive. A bottom section 51 of the additive container 40 in the area of the housing bottom 46 serves as an additional reservoir for the additive. The bottom section 51 is located outside of a region of the additive chamber 50 adjacent to an oil guidance space 54.

A plurality of dispensing ports 52 are disposed peripherally in the peripheral section of the partition 42 and distributed in the axial direction. The dispensing ports 52 connect the additive chamber 50 to the oil guidance space 54. The oil guidance space 54 extends in the intermediate space between the partition 42 and the radially exterior peripheral side of the filter bellows 26. On the side facing the filter cover 18 axially, the oil guidance space 54 develops into an oil inlet space 56 into which the oil inlets 24 open. On the side facing the housing bottom 46, the oil guidance space 54 is bordered by the bottom section of the partition 42. The dispensing ports 52 closest to the housing bottom 46, i.e., being at the bottom, are situated near the bottom section of the partition 42.

Furthermore, the peripheral section of the partition 42 has a plurality of deep-drawn nubs 58. The deep-drawn nubs 58 are distributed along the peripheral section of the partition 42. They each extend peripherally over a portion of the circumference. The deep-drawn nubs 58 are elevated toward the outside radially from the main surface of the peripheral section of the partition 42. They may be supported on the radially inner peripheral side of the exterior wall 44. The exterior wall 44 and the partition 42 are held radially at a distance by means of the deep-drawn nubs 58.

The free edges of the partition 42 and of the outside wall 44 facing the filter cover 18 border a filling port 60 of the additive container 40 for the additive. The filling port 60 is in the form of an annular gap that is cohesive on the periphery. The filling port 60 is tightly closed with a filling closure element in the form of an annular stopper 62.

In the original condition of the additive dispensing device 38 before its first use, the dispensing ports 52 are each closed with a closure element 64. The closure elements 64 are adhesive films, which in this exemplary embodiment are adhesively glued to the partition 42 from the additive chamber 50. The adhesive films undergo chemical aging due to motor oil and therefore can be dissolved.

To produce the additive dispensing device 38, the exterior wall 44 and the partition 42 are flange-connected to one another. The closure elements 64 are adhesively bonded to the dispensing ports 52. The additive container 40 is filled with the corresponding additive through the filling port 60. Then the filling port 60 is tightly closed with the stopper 62.

The filled additive container 40 is inserted into the filter pot 16 through the installation orifice with the bottom section 51 facing forward. The helical compression spring 48 is placed in the housing bottom 46. The prefabricated filter element 12 is inserted with the bottom end disk 34 first into the filter pot 16 and placed inside the additive container 40.

The additive container 40 may contain a wide variety of additives or additive mixtures. A friction modifier, for example, may be used to reduce fuel consumption. Friction losses on moving engine parts can be reduced by using a friction modifier. Alternatively or additionally, for example, a TBN booster, which reacts with acids formed by combustion, may be used. Acidification of the motor oil can be retarded by using a TBN booster.

During operation of the internal combustion engine, motor oil flows through the oil inlet channel of a filter head into the oil inlets 24 of the oil filter 10 from which the motor oil returns to the oil feed chamber 56 and then flows out of it into the oil guidance space 54. The oil guidance space 54 surrounds the filter bellows 26 on its crude oil side on the outside radially. The motor oil flows from the outside radially to the inside radially through the filter bellows 26 and passes through the flow-through orifices 37 in the supporting tube 36 into the element interior space 32. The filtered motor oil leaves the oil filter 10 through the oil outlet 22 and enters the oil drain channel of the filter head.

The motor oil also comes in contact with the closure elements 64 in the oil guidance space 54. Over the operating time of the oil filter 10, the motor oil dissolves the closure elements 64 gradually, so that the dispensing ports 52 of the additive container 40 are ultimately released. Then the motor oil passes through the dispensing ports 52 and is brought in contact with the additive in the additive chamber 50. The additive then enters the motor oil and is consumed there.

What is claimed is:

1. An additive container of a filter for a liquid for an internal combustion engine, the additive container comprising:
   an additive container (40) forming an additive chamber (50) delimited and enclosed by:
   an interior partition wall (42);
   an exterior partition wall (44) spaced radially outwardly from the interior partition wall (42), the exterior partition wall (44) extending axially from an upper end disk of a round hollow filter element (12) to a bottom end disk (34) of the round hollow filter element (12); and
   a bottom partition wall extending from the exterior partition wall (44) to the interior partition wall (42) at a bottom end of the additive container (40) to close a bottom of the additive chamber (50),
   wherein the partition walls define and enclose the additive chamber (50) forming an additive reservoir for dispensing at least one additive; and
   the additive container (40) further comprising:
   a dispensing port (52) extending through interior partition wall (42) for dispensing the at least one additive from the additive chamber (50); and
   at least one closure element (64) arranged directly on and closing the at least one dispensing port (52);
   wherein the additive container (40) is adapted to be arranged in a filter housing (14) having at least one inlet (24) and at least one outlet (22) for the liquid to be treated, so that it surrounds at least peripherally the round hollow filter element (12) and a liquid region (66) surrounding at least peripherally the round hollow filter element (12) for the liquid to be treated;
   wherein in the original condition of the additive container (40), the closure element (64) is dissolvable by the liquid to be treated to open the at least one dispensing port (52) during operation of the filter (10).

2. A filter for a liquid for an internal combustion engine, comprising:
   a filter housing (14) including
   a chamber enclosed within the filter housing (14);
   at least one inlet (24) for receiving liquid to be treated; and
   at least one outlet (22) for treated liquid;
   a round hollow filter element (12) arranged within the chamber of the filter housing (14) and separating the at least one inlet from the at least one outlet;
   at least one liquid guidance region (54) at least partially surrounding the filter element (12) within the chamber;
   an additive dispensing device (38) having an additive container (40), the additive container (40) forming an additive chamber (50) delimited and enclosed by:
   an interior partition wall (42) spaced radially outwardly from the filter element (12), the interior partition wall (42) extending axially from an upper end disk of the filter element (12) to a bottom end disk (34) of the filter element;
   an exterior partition wall (44) spaced radially outwardly from the interior partition wall (42), the exterior partition wall (44) extending axially from an upper end disk of the filter element (12) to a bottom end disk (34) of the filter element (12); and
   a bottom partition wall extending from the exterior partition wall (44) to the interior partition wall (42) at the bottom end disk (34) to close a bottom of the additive chamber (50),
   wherein the partition walls define and enclose the additive chamber (50) forming an additive reservoir for dispensing at least one additive; and
   wherein the partition walls are arranged within the chamber in an interior of the filter housing (14);
   wherein the interior partition wall (42) separates the at least one liquid guidance region (54) from the additive chamber (50);
   the additive container (40) further comprising:
   a dispensing port (52) extending through interior partition wall (42) for dispensing the at least one additive from the additive chamber (50) into the at least one liquid guidance region (54); and at least one closure element (64) arranged directly on and closing the at least one dispensing port (52);

wherein in the original condition of the additive dispensing device (38), the at least one closure element (64) being dissolvable by the liquid to be treated to open the at least one dispensing port (52) during operation of the filter (10);

an additional additive chamber (51) forming an additional reservoir for the at least one additive, the additional additive chamber (51) arranged on a bottom outer side of the bottom end disk (34) and at a bottom outer side of the bottom partition wall, the additional additive chamber (51) providing additional additive storage axially below the filter element (12) in otherwise unused space of the filter housing (14).

3. The filter according to claim 2, wherein the partition walls surround the hollow filter element (12) and the liquid guidance region (54) cohesively on the periphery.

4. The filter according to claim 2, wherein at least one supporting element;

wherein the at least one supporting element is at least one deep-drawn nub (58), wherein the deep drawn nub comprises a depression formed into the inner partition wall (42), the depression forming a corresponding radially outwardly projecting nub on a radially outer surface of the inner partition wall (42), the radially outwardly projecting nub contacting the exterior partition wall (44) in an interior of the additive chamber (50).

5. The filter according to claim 2, wherein the additive chamber (50) or the additive container (40) is separated at least originally from the filter housing (14).

6. The filter according to claim 2, wherein the partition walls or the additive container (40) is comprised of metal or plastic material.

7. The filter according to claim 2, wherein the at least one of the closure elements (64) can be dissolved as a function of a physical and/or chemical condition of the liquid to be treated and/or a duration of action of the liquid on the at least one closure element (64).

8. The filter according to claim 2, wherein the at least one closure element (64) comprises an adhesive film or a membrane.

9. The filter according to claim 2, wherein the additive container (40) has an additive filling port arranged at an axially upper end of the additive container (40), the additive filling port openable for filling the at least one additive;

wherein the at least one filling port (60) is closable.

10. The filter according to claim 9, wherein the additive filling port (60) is at least partially formed by an annular gap between the interior partition wall and the exterior partition wall.

11. The filter according to claim 10, wherein an annular stopper (62) is arranged on and closing the additive filling port (60) in a re-openable, re-closeable manner.

12. The filter according to claim 9, wherein the additive filling port (60) is at least partially formed by an annular gap on additive container (40).

* * * * *